(12) United States Patent
Guidetti et al.

(10) Patent No.: US 10,935,444 B2
(45) Date of Patent: Mar. 2, 2021

(54) STRESS SENSOR FOR MONITORING THE HEALTH STATE OF FABRICATED STRUCTURES SUCH AS CONSTRUCTIONS, BUILDINGS, INFRASTRUCTURES AND THE LIKE

(71) Applicant: STMICROELECTRONICS S.R.L., Agrate Brianza (IT)

(72) Inventors: Elio Guidetti, Montano Lucino (IT); Mohammad Abbasi Gavarti, Milan (IT); Daniele Caltabiano, Agrate Brianza (IT); Gabriele Bertagnoli, Turin (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 478 days.

(21) Appl. No.: 15/957,819

(22) Filed: Apr. 19, 2018

(65) Prior Publication Data

US 2018/0306656 A1      Oct. 25, 2018

(30) Foreign Application Priority Data

Apr. 21, 2017    (IT) ................ 102017000044301

(51) Int. Cl.
*G01L 1/18*      (2006.01)
*G01L 25/00*     (2006.01)
(Continued)

(52) U.S. Cl.
CPC ............. *G01L 1/18* (2013.01); *G01L 5/162* (2013.01); *G01L 25/00* (2013.01); *G01M 5/0041* (2013.01); *G01M 5/0083* (2013.01)

(58) Field of Classification Search
CPC .......... G01L 1/18; G01L 25/00; G01L 5/162; G01M 5/0041; G01M 5/0083
See application file for complete search history.

(56) References Cited

U.S. PATENT DOCUMENTS

| 5,773,728 A | 6/1998 | Tsukada et al. |
| 8,636,461 B2 | 1/2014 | Hammonds |
| (Continued) |

FOREIGN PATENT DOCUMENTS

| CN | 202974521 U | 6/2013 |
| CN | 103398807 A | 11/2013 |
| (Continued) |

OTHER PUBLICATIONS

Baumann et al., "CMOS-Based High-Pressure Sensor Using Surface Trenches for Sensitivity Enhancement," *IEEE Sensors 2010 Conference*, Waikoloa Hawaii, USA, Nov. 1-4, 2010, pp. 2644-2647.

(Continued)

*Primary Examiner* — Jamel E Williams
(74) *Attorney, Agent, or Firm* — Seed IP Law Group LLP

(57) ABSTRACT

A stress sensor formed by a membrane plate; a first bonding region arranged on top of the membrane plate; a cover plate arranged on top of the first bonding region, the first bonding region bonding the membrane plate to the cover plate; three-dimensional piezoresistive elements extending across the membrane plate that are embedded in the bonding layer; and planar piezoresistive elements that extend across the membrane plate and are surrounded by and separated from the bonding layer.

24 Claims, 11 Drawing Sheets

(51) Int. Cl.
*G01L 5/162* (2020.01)
*G01M 5/00* (2006.01)

(56) References Cited

U.S. PATENT DOCUMENTS

| | | | |
|---|---|---|---|
| 9,487,388 | B2 | 11/2016 | Brosh |
| 9,676,614 | B2 | 6/2017 | Johari-Galle et al. |
| 9,804,047 | B2* | 10/2017 | Pagani .................... G01L 15/00 |
| 10,167,189 | B2 | 1/2019 | Zhang et al. |
| 10,549,982 | B2* | 2/2020 | Duqi ..................... B81B 3/0094 |
| 2007/0113658 | A1 | 5/2007 | Combi et al. |
| 2009/0154734 | A1 | 6/2009 | Jeong et al. |
| 2010/0073123 | A1* | 3/2010 | Craddock ........... G01L 19/0069 338/42 |
| 2011/0146411 | A1 | 6/2011 | Doering et al. |
| 2011/0239784 | A1 | 10/2011 | Ohsato |
| 2012/0042731 | A1 | 2/2012 | Lin et al. |
| 2013/0199301 | A1 | 8/2013 | Kautzsch |
| 2016/0282206 | A1 | 9/2016 | Baumann |
| 2016/0349129 | A1 | 12/2016 | Pagani et al. |
| 2016/0370242 | A1 | 12/2016 | Duqi et al. |
| 2018/0074090 | A1 | 3/2018 | Boysel |
| 2018/0238753 | A1 | 8/2018 | Abbas et al. |
| 2018/0275000 | A1 | 9/2018 | Chau et al. |
| 2018/0306656 | A1 | 10/2018 | Guidetti et al. |
| 2018/0312393 | A1 | 11/2018 | Abbas et al. |
| 2018/0372564 | A1 | 12/2018 | Abbas et al. |
| 2019/0074231 | A1* | 3/2019 | Hiblot .................... H01L 22/32 |
| 2019/0162615 | A1* | 5/2019 | Okawa .................... G01L 13/00 |

FOREIGN PATENT DOCUMENTS

| | | |
|---|---|---|
| CN | 103575446 A | 2/2014 |
| CN | 205826188 U | 12/2016 |
| EP | 2 423 157 A2 | 2/2012 |
| EP | 3 396 344 A1 | 10/2018 |
| WO | WO-2007010570 A1 * 1/2007 ............. G01L 15/00 |

OTHER PUBLICATIONS

Baumann et al., "Modeling and Characterization of a CMOS Sensor with Surface Trenches for High-Pressure Applications," *MEMS 2011*, IEEE, Cancun, Mexico, Jan. 23-27, 2011, pp. 601-604.

Hwang et al., "A Polymer-Based Flexible Tactile Sensor for Both Normal and Shear Load Detections and Its Application for Robotics," *Journal of Microelectromechanical Systems* 16(3):556-563, 2007.

* cited by examiner

STRESS SENSOR FOR MONITORING THE HEALTH STATE OF FABRICATED STRUCTURES SUCH AS CONSTRUCTIONS, BUILDINGS, INFRASTRUCTURES AND THE LIKE

BACKGROUND

Technical Field

The present disclosure relates to a stress sensor for monitoring the health state of fabricated structures such as constructions, buildings, infrastructures and the like. Henceforth, specific reference shall be made to concrete building structures, without thereby limiting the scope of the disclosure to this type of structure and/or this material. The disclosure applies in general to structures or parts of structures of any type that are fabricated from liquid or fluid materials at the time of fabrication or production and then hardened, for example plastics, for which the stress state needs to be monitored over time.

Description of the Related Art

As is known, to detect the health state of fabricated structures in the field of construction, it's useful to detect the mechanical strength of same. Mechanical strength depends on a number of factors. For example, in the case of structures on road traffic routes, such as tunnels, overpasses, etc., mechanical strength depends, inter alia, on the initial strength of same (at the time of fabrication), the type of loads borne over time in normal operation, any extraordinary stresses, environmental conditions of fabrication, temperature during lifetime, humidity, age of the structure, etc.

Moreover, it is becoming increasingly important to observe, monitor and assess structural conditions over time in order to prevent disasters wherever possible, simultaneously reducing the need for in-depth and costly inspections.

Existing non-destructive evaluation (NDE) techniques use sensors that are attached to the structure to be monitored and that indirectly measure the stresses acting on the construction being observed by correlation with other variables (external forces, inclines, deformations, etc.).

However, existing sensors are large, costly and liable to considerable error. Additional drawbacks of existing systems are related to the fact that such systems have small coverage areas and require complicated signal processing, and in some cases that the sensor causes high local mechanical distortions on the structure being monitored.

Nowadays, such sensors are based on different physical principles, using the optical or magnetic properties of same. Each of these approaches has specific advantages and drawbacks.

For example, the use of strain gauges and optical fiber equipment has been proposed. However, strain gauges are costly, mounted externally and take indirect measurements of deformation. Such measurements therefore need to be transformed into tensions, and this entails significant simplifications, and as such the result is not always reliable and precise. Optical fiber equipment is costly and complex to operate. Furthermore, optical fiber equipment also takes indirect measurements of deformation.

Even where such sensors are embedded in the structure to be monitored, the sensors are not properly protected and therefore not immune to humidity and other influences that could distort the results and/or reduce the service life of same.

In general, the possibility of using sensors applied to buildings and civil engineering structures on a large scale would benefit from the development of innovative distributed sensors that are able to satisfy the following features: high accuracy, high robustness, low cost, high immunity to magnetic interference, simple to position, simple operation, optimum surface adhesion to the structure to be monitored and possibility of remote control.

BRIEF SUMMARY

One or more embodiments of the present disclosure provide a stress sensor for fabricated structures that overcomes the drawbacks in the prior art.

At least one embodiment of the present disclosure provides for a stress sensor that includes:

a membrane plate;

a first bonding layer superposed on the membrane plate;

a cover plate superposed on the first bonding layer, the first bonding layer bonding the membrane plate to the cover plate;

three-dimensional piezoresistive elements extending across the membrane plate and embedded in the first bonding layer; and planar piezoresistive elements extending across the membrane plate, the planar piezoresistive elements being laterally surrounded by and separated from the first bonding layer.

BRIEF DESCRIPTION OF THE SEVERAL VIEWS OF THE DRAWINGS

The present disclosure is further described below with reference to preferred embodiments of same, which are provided purely as non-limiting examples, and to the attached drawings, in which.

DETAILED DESCRIPTION

Figure 1:
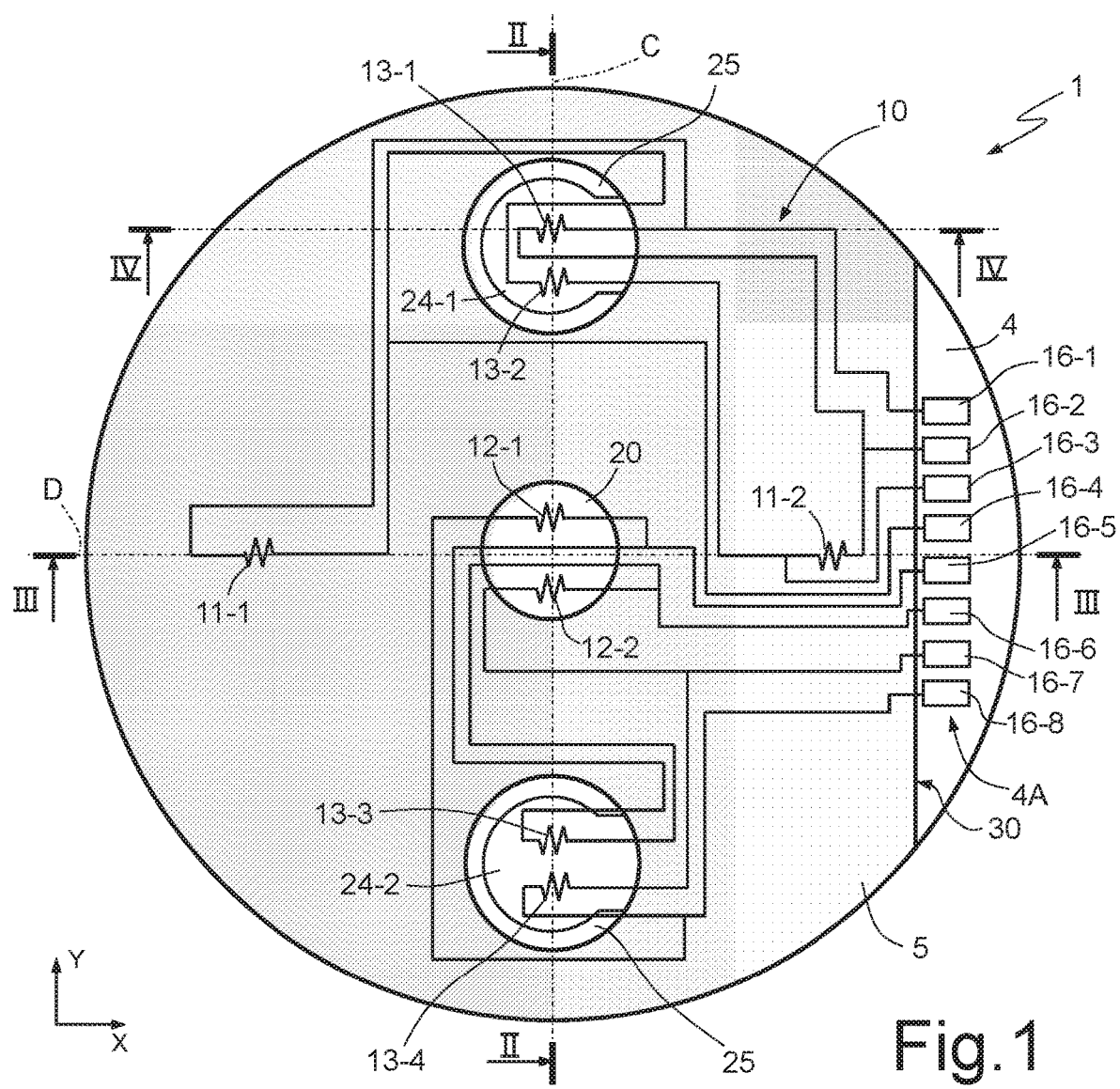
FIG. 1 is a top view of an embodiment of the present sensor with some portions removed and some transparent portions.

FIGS. 1-6 show a first embodiment of a stress sensor 1 designed to be embedded in a material that is initially fluid at low temperatures (less than 300-350° C.) that only becomes solid when the temperature is lowered and/or over time. In particular, the sensor described herein is particularly suited to being embedded in a mass of concrete for building constructions such as building infrastructures.

The stress sensor 1 is made up of a stack of layers including, in sequence, a first outer plate 2 hereinafter referred to as the base plate 2, a first bonding layer 3, an intermediate plate 4 hereinafter referred to as the membrane plate 4, a second bonding layer 5 and a second outer plate 6 hereinafter referred to as the cover plate 6.

In the example shown in FIGS. 1-6, the plates 2, 4 and 6 have an overall cylindrical shape with a circular base and equal diameter and the centers of same are aligned vertically and parallel to an axis Z of a Cartesian coordinate system XYZ, on account of which the sensor 1 has an overall substantially cylindrical shape with a circular base. The second plate 6 and the second bonding layer 5 have a cut-out 30 on one side (to the right in FIG. 1, also visible in FIGS. 6D and 6E). The cut-out 30 reveals a circular segment 4A of the membrane plate 4. The sensor 1 therefore has a first face and a second face (the bases of the cylindrical shape) 1A and 1B formed respectively by the base plate 2 and by the cover plate 6, in which the first face 1A is circular and the second face 1B is a blunted circle.

The base and cover plates 2, 6 are used to uniformly transfer the stresses being measured to the membrane plate 4. Furthermore, said plates are configured to withstand external stresses without breaking. In the embodiment shown, the base plate 2 and the cover plate 6 are made of ceramic, typically aluminum oxide, and a relatively thick. The membrane plate 4 preferably is deformable under the stresses transmitted by the base and cover plates 2, 6, but also robust enough to withstand any loads applied. Said plate is therefore also made of ceramic thin enough to provide good sensitivity. Said plate is therefore much thinner than the base and cover plates 2, 6. In addition to joining the plates 2, 4, 6, the bonding layers 3, 5 are designed to transfer the stresses acting on the base and cover plates 2, 6 to the membrane plate 4, and to seal the components housed in the sensor. Said layers are thinner and therefore made of glass (for example low-melting glass).

The exact dimensions of the sensor 1 are related to the intended application. In general, the total thickness of the sensor 1 is approximately one tenth of the diameter of the bases 1A, 1B. In particular, for the application in question, i.e., for embedding in a concrete structure, concrete being a non-uniform material containing particles (such as sand, voids, etc.) of non-negligible size that may give rise to local stress peaks, the plates 2, 4 and 6 may have a diameter of between 1 mm and 10 cm, for example 2.5 cm, the thickness of the base and cover plates 2, 6 may be between 200 μm and 5 mm, for example 1.2 mm, the thickness of the membrane plate 4 may be between 5 μm and 2 mm, for example 250 μm, and the thickness of the bonding layers 3 and 5 may be between 1 μm and 200 μm, for example 50 μm.

The membrane plate 4 has a detection circuit 10 including 3D detection resistors 11-1, 11-2 (hereinafter also referred to as 3D detection resistors 11), planar detection resistors 12-1, 12-2 (hereinafter also referred to collectively as planar detection resistors 12) and reference resistors 13-1, 13-2, 13-3 and 13-4 (hereinafter also referred to collectively as reference resistors 13). The resistors 11-13 are connected together and to pads 16-1 to 16-8 (hereinafter also referred to collectively as pads 16) via linear conductors 17 (FIG. 3) such as to form two bridge structures, as described below with reference to FIG. 5. The resistors 11-13 are all piezoresistors made from thick film technology, such as ruthenium oxide 10-15 μm thick, and the linear conductors 17 and the pads 16 are for example made using alloys of palladium, silver and platinum. The detection circuit 10, with the exception of the pads 16, is covered by the second bonding layer 5 that, along with the first bonding layer 3, seals the detection circuit 10, other than the pads 16, from the outside and transfers stresses and forces exerted on the base and cover plates 2, 6 to the membrane plate 4 and therefore to the resistors 11-13, as explained in detail below. The pads 16 are arranged on the circular segment 4A of the membrane plate 4 and are therefore not covered by the second bonding layer 5 and by the cover plate 6.

In particular and as shown in FIG. 1, in which the cover plate 6 has been removed and the second bonding layer 5 is shown transparent, so that the detection circuit 10 can be seen, the resistors 11-13 are arranged and/or made symmetrically about two mutually perpendicular diametral lines C, D of the sensor 1, coinciding in FIG. 1 with the cross-section lines II-II and In detail, the 3D detection resistors 11-1, 11-2 are arranged symmetrically to one another about the first diametral line C. Furthermore, each of said resistors is symmetrical about the second diametral line D. The 3D detection resistors 11 are arranged in two intermediate zones of two aligned radiuses forming the second diametral line D. As shown in FIG. 1 and in the cross section in FIG. 3, said resistors are entirely embedded in the second bonding layer 5, which is therefore in direct contact with the lateral and upper surfaces of the 3D detection resistors 11. Said resistors are also in direct contact with the membrane plate 4 via the lower surfaces of same.

Figure 3:
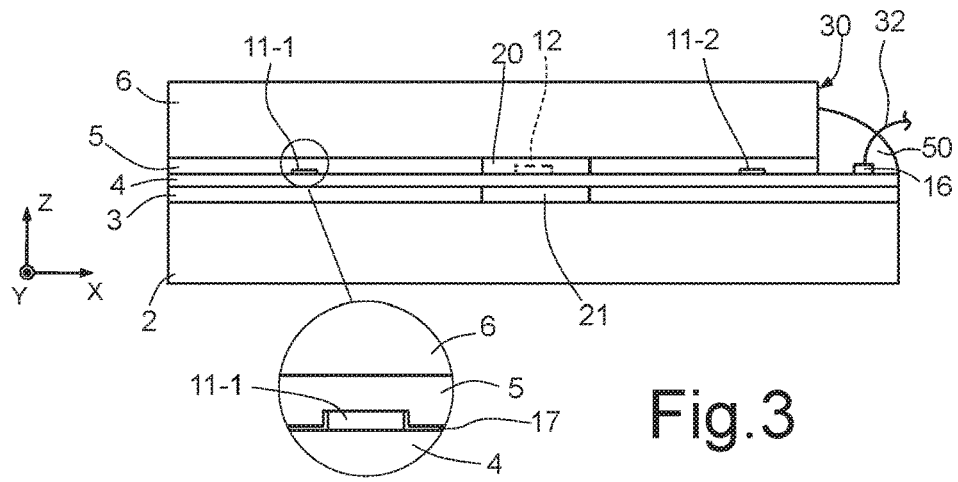
FIG. 3 is a cross section taken along cross-section line in FIG. 1.
Figure 2:
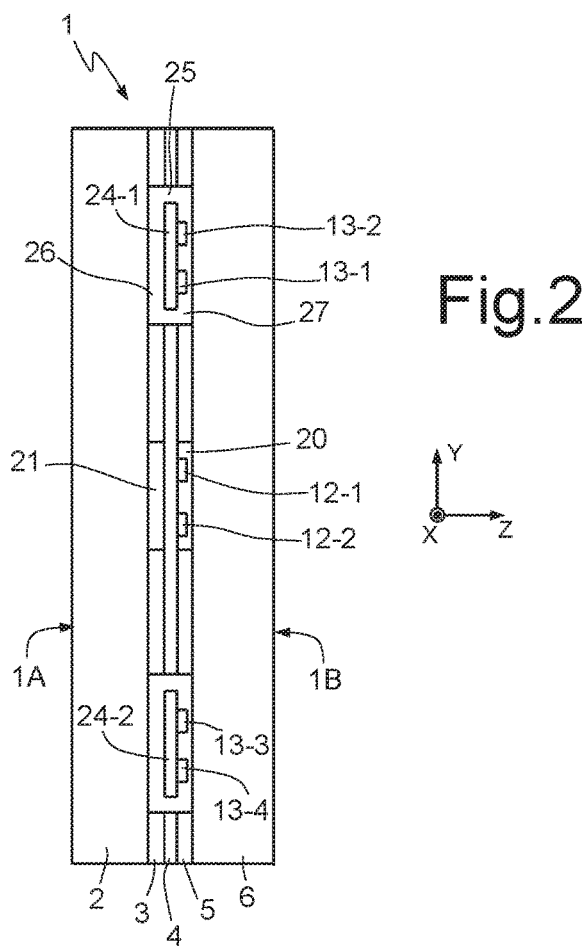
FIG. 2 is a cross section taken along cross-section line II-II in FIG. 1.
Figure 4:
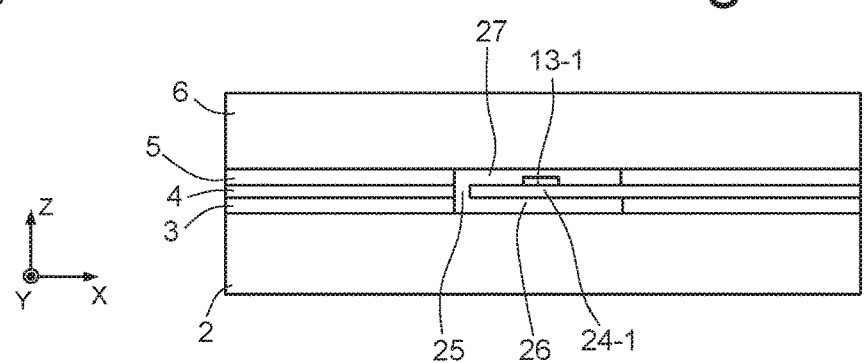
FIG. 4 is a cross section taken along cross-section line IV-IV in FIG. 1.

The planar detection resistors 12 are in this case arranged in a central zone of the membrane plate 4, symmetrically about the second diametral line D, and each of said resistors is symmetrical about the first diametral line C. As shown in FIGS. 1-3, the planar detection resistors 12 are arranged inside a central aperture 20 of the second bonding layer 5, which therefore laterally surrounds and is separated from both planar detection resistors 12. The planar detection resistors 12 are therefore not in contact with the material of the second bonding layer 5. Furthermore, a central aperture 21 of the first bonding layer 3 is aligned vertically (parallel to the axis Z) with the central aperture 20 of the second bonding layer 5 and is separated, via the central aperture 20, from the membrane plate 4 (see also FIGS. 6B and 6D, which are top views of the first and second bonding layers 3, 5 respectively). The central apertures 20, 21 are through-holes and pass through the entire thickness of the bonding layers 3, 5, although this is not essential, it being sufficient for the central apertures 20, 21 to keep the cover and base plates 6, 2 separated from the membrane plate 4 and from the planar detection resistors 12.

Figure 6A:
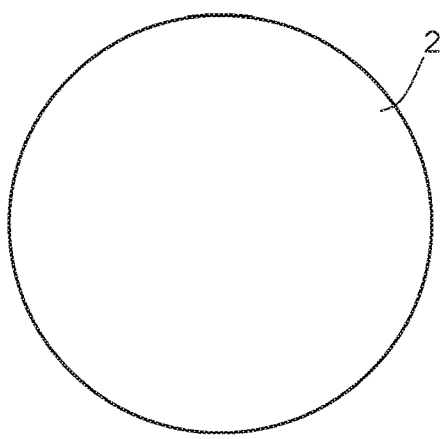
Figure 6B:
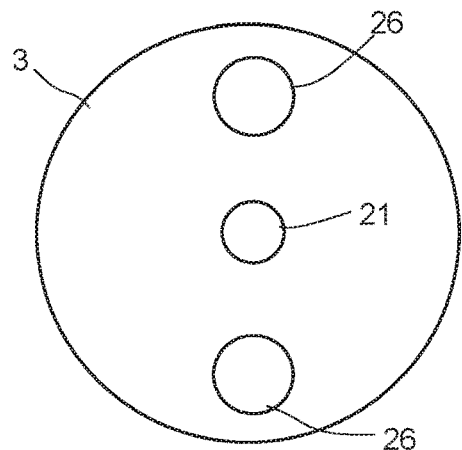
Figure 6C:
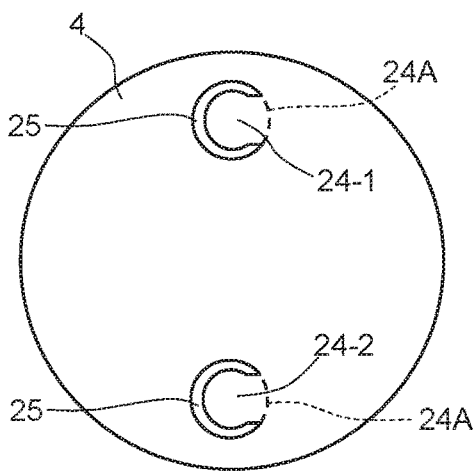
Figure 6D:
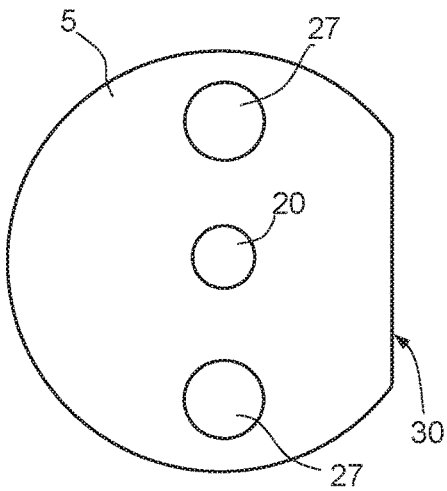
Figure 6E:
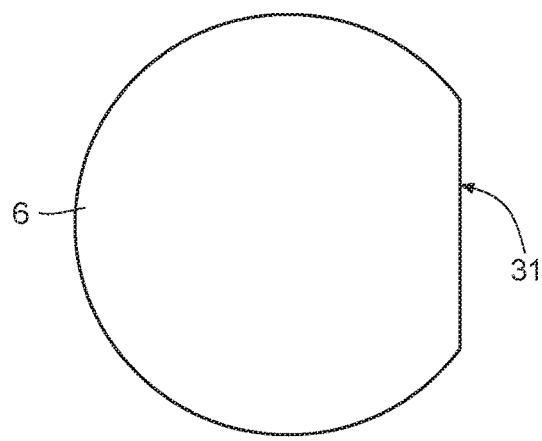

The reference resistors 13 are arranged in pairs symmetrically about the second diametral line D and each of said resistors extends symmetrically about the first diametral line C. The reference resistors 13-1, 13-2 are arranged on a first bracket 24-1 and the reference resistors 13-3, 13-4 are arranged on a second bracket 24-2. The brackets 24-1, 24-2 are formed by the membrane plate 4 in two peripheral zones arranged diametrically opposite same about the second diametral line X (see also FIG. 6C, showing a top view of the membrane plate 4, in which the detection circuit 10 is not shown). The brackets 24-1, 24-2 are delimited by C-shaped through-trenches 25 arranged such that each bracket 24-1, 24-2 is connected to the rest of the membrane plate 4 with one side 24A of same (see in particular FIG. 6C) oriented towards the periphery of the membrane plate 4.

In particular, the two sides 24A of the brackets 24-1, 24-2 are aligned with one another (parallel to the axis Y of the Cartesian coordinate system XYZ) and are arranged in the same half of the membrane plate 4 (in the example shown, the right-hand half). Two cavities 26 in the first bonding layer 3 (FIGS. 4 and 6B) and corresponding cavities 27 in the second bonding layer 5 (FIGS. 4 and 6D) are aligned vertically (parallel to the axis Z) with one another and with the through-trenches 25. The cavities 26 and 27, which are through-holes in this case, are therefore connected together via the respective trench 25 in the membrane plate 4 and disconnect the brackets 24-1, 24-2 and the reference resistors 13 carried on same from the base and cover plates 2, 6. The reference resistors 13 are therefore to a first approximation unaffected by the vertical stresses acting in a direction perpendicular to the plates 2, 4 and 6. Furthermore, given that the brackets 24-1, 24-2 are connected to the membrane plate 4 at the sides 24A only, the reference resistors 13 are, to a first approximation, also unaffected by the planar stresses acting on the membrane plate 4 (or are at least less sensitive than the other resistors 11, 12).

In the example embodiment shown, the pads 16 (in this case eight pads) are arranged beside one another on the same side of the second diametral line D, on the circular segment 4A. Electrical connection wires 32 (FIG. 3) are welded to the pads 16 to connect the detection circuit 10 to the external processing and power unit, as described below with reference to FIG. 8. The pads 16 and the ends of the electrical connection wires 32 are covered by a passivation mass 50, for example epoxy resin, as shown in FIG. 3.

Figure 5:
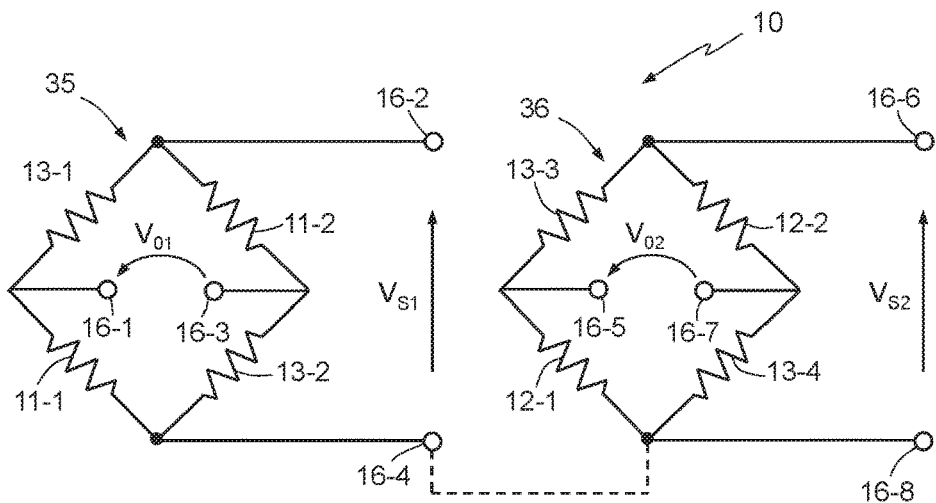
FIG. 5 shows the electrical equivalent of the sensor in FIGS. 1-4, FIGS. 6A-6E are top views of the different layers that make up the sensor in FIGS. 1-5.

FIG. 5 shows first and second Wheatstone bridges 35, 36 formed by the resistors 11-13.

More specifically, the 3D detection resistors 11-1 and 11-2 are arranged on diagonally opposite sides of the first Wheatstone bridge 35 also including the reference resistors 13-1 and 13-2, arranged on another two diagonally opposite sides. The first Wheatstone bridge 35 in this case has a pair of polarization terminals connected to the pads 16-2, 16-4, that are designed to receive a polarization voltage $V_{S1}$, and a pair of output terminals connected to the pads 16-1, 16-3, that are designed to supply an output voltage $V_{O1}$.

Furthermore, the planar detection resistors 12-1 and 12-2 are arranged on diagonally opposite sides of the second Wheatstone bridge 36 also including the reference resistors 13-3 and 13-4, arranged on another two diagonally opposite sides. The second Wheatstone bridge 36 in this case has a pair of polarization terminals connected to the pads 16-6, 16-8, that are designed to receive a polarization voltage $V_{S2}$, and a pair of output terminals connected to the pads 16-5, 16-7, that are designed to supply an output voltage $V_{O2}$. The polarization voltages $V_{S1}$, $V_{S2}$ may be the same, in which case the respective pads 16-6, 16-8 may coincide with the polarization pads 16-2, 16-4 of the first Wheatstone bridge 35, but the separate arrangement of same enables separate contact of the two Wheatstone bridges 35, 36, which are therefore able to operate independently. The sequential powering of the two Wheatstone bridges 35, 36 (via independent polarization voltages $V_{S1}$, $V_{S2}$) also optimizes power consumption, for example where there is a single analogue-digital converter in the successive signal processing stages, as described below with reference to FIG. 8.

As an alternative, only the reference terminals of the Wheatstone bridges 35, 36 are connected together (as shown in FIG. 5 using dotted line) and to just one of the pads 16-4, 16-8 (thereby saving one of the two).

When in use and as shown in a simplified manner in FIG. 7, if the sensor 1 is subjected to direct crushing forces perpendicular to the outer faces 1A and 1B of same (represented by the resultant F1, hereinafter referred to as transverse force), crushing occurs in direction Z and stretching occurs in the plane XY (this phenomenon is modelled using the Poisson's ratio). Similarly, if the sensor 1 is subjected to compression loads along the outer cylindrical surface (shown in FIG. 7 by the resultant F2, hereinafter referred to as planar force), the sensor is crushed radially in the plane XY, but expands in direction Z.

The forces F1 and F2 therefore cause an axial deformation in direction Z and a radial deformation in the plane XY. In a known manner, these deformations cause a change in the resistivity of the piezoresistors 11-13, which can be detected using the Wheatstone bridges 35, 36 in FIG. 5.

In particular, the 3D detection resistors 11-1 and 11-2 are influenced both by the axial deformation in direction Z and by the radial deformation in the plane XY. The 3D detection resistors 11-1 and 11-2 sense the deformations in all three directions XYZ because of the direct vertical contact with the membrane plate 4 and the bonding layer 5 in the Z direction and the direct lateral contact with the bonding layer 5 in the X and Y directions. Such direct contact transfers the forces in the XYZ directions directly to the 3D detection resistors 11-1 and 11-2. The reference resistors 13-1 and 13-2, arranged on a bracket 24 and therefore to a first approximation unaffected by the forces F1 and F2, act in this case a zero reference. The output voltage $V_{O1}$ of the first Wheatstone bridge 35 therefore depends on the value of the forces F1, F2 in FIG. 6.

Conversely, the planar detection resistors 12 are disconnected from the base and cover plates 2, 6 through the apertures 26, 27 and are therefore only subjected, to a first approximation, to the planar deformation acting in the plane XY on the membrane plate 4. The reference resistors 13-3 and 13-4 (similarly to the reference resistors 13-1 and 13-2 of the first Wheatstone bridge 35) act as a zero reference, and consequently the output voltage $V_{O1}$ of the second Wheatstone bridge 36 approximately depends only on the value of the planar deformation in the plane XY.

Appropriately combining the signals supplied by the first and second Wheatstone bridges 35, 36 makes it possible to generate a signal that is proportional, to a first approximation, only to the transverse force F1, as discussed below.

Figure 8:
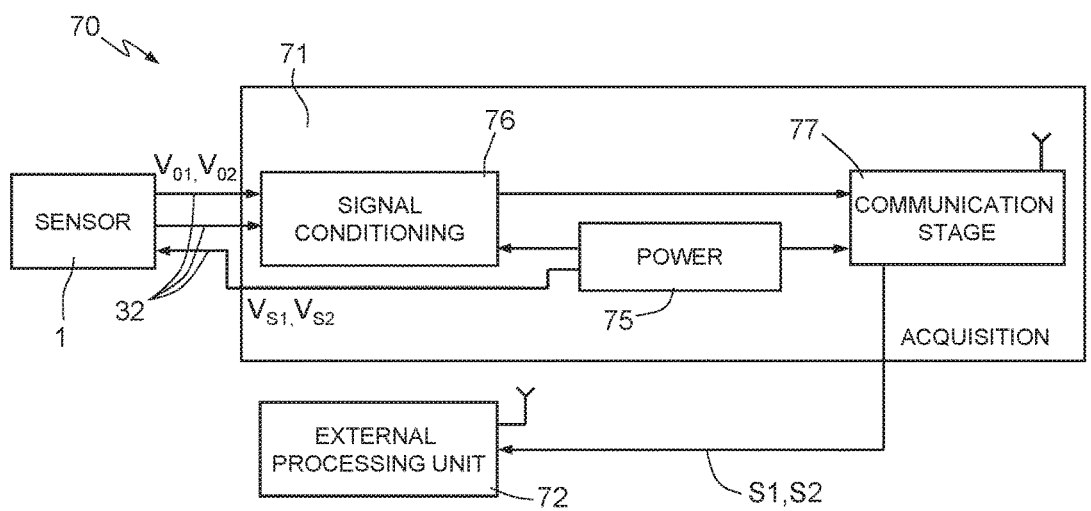
FIG. 8 shows a monitoring system including the present sensor.

The sensor 1 is connected to a stress detection system 70 shown schematically in FIG. 8 broadly comprising an acquisition unit 71, that is for example also designed to be embedded in the structure being monitored, and a processing unit 72, that is for example positioned outside the structure being monitored. The acquisition unit 71 is connected to the sensor 1 via electrical connection wires 32, supplying same with power (polarization voltages $V_{S1}$, $V_{S2}$ in FIG. 5), and receives the output voltages $V_{O1}$, $V_{O2}$ from the first and second Wheatstone bridges 35, 36. The external unit 72 is connected to the acquisition unit 71 using a wired transmission system, for example a controller area network (CAN) bus or RS485 interface, or a wireless transmission system, for example radio signal transmission systems, such as radio-frequency identification (RFID), Bluetooth Low Energy or Wi-Fi) and processes the signals s1, s2 received to determine information on the health of the structure being monitored.

For example, the acquisition unit 71 may include a power stage 75, a signal conditioning stage 76 for amplifying and digitizing the signals received from the sensor 1, and a communication stage 77. In this case, the power stage 75 generates the power to operate stages 76 and 77, as well as the polarization voltages $V_{S1}$, $V_{S2}$; the signal conditioning stage 76 amplifies the output voltages $V_{O1}$, $V_{O2}$ and converts same into the digital signals s1, s2 in a digital format; and the communication stage 77 serializes the digital signals s1, s2 and sends same to the external unit 72 using known communication protocols.

The external unit 72 processes digital signals s1, s2 received from the acquisition unit 71. In particular, said unit determines the load L acting on the sensor 1 using the following equation:

$$L = 1/\text{sens} * (s1_C - As2_C) \quad (1)$$

where $s1_C$ and $s2_C$ are the temperature-compensated signals s1 and s2, A is a weighting coefficient between the 3D detection resistors 11 and the planar detection resistors 12, which depends on the specific geometry, and sens is the sensitivity of the sensor.

In (1), the sensitivity value sens [mV/V/Mpa] is determined during the calibration phase of the sensor, as is the weighting coefficient A.

The signals $s1_C$ and $s2_C$ can be obtained directly from the bridges 35, 36, if the detection circuit 10 includes temperature and offset compensation resistors (as described below for example with reference to FIG. 9). Alternatively, these can be calculated by the external unit on the basis of a measured or estimated temperature signal T, as follows:

$$s1_C = s1 - (\text{off1} + TC1*(T-T0))$$

$$s2_C = s2 - (\text{off2} + TC2*(T-T0))$$

where T0 is a reference temperature (for example 25° C.), off1 and off2 are output signals from the two bridges 35, 36 with no load and at temperature T0, and TC1 and TC2 are coefficients that correlate the value of the offset as the temperature varies. The values off1, off2, TC1 and TC2 are obtained by performing in-factory tests on each sensor, for example measuring the offset with no load and at two temperatures T0 and T1, for example at 25° C. and 85° C. respectively. This results in the linear law shown above. More complex approximations, for example quadratic or piecewise-linear approximations, can be used as an alternative.

The external unit 72 can then determine the health state of the structure containing the sensor 1 on the basis of the load value L determined.

FIGS. 9-12 are schematic views of an embodiment of a sensor 100 containing calibration resistors. In the sensor 100, components similar to the embodiment in FIGS. 1-5 have been indicated using reference signs increased by 100.

More specifically, the sensor 100 is made up of a base plate 102, a first bonding layer 103, a membrane plate 104, a second bonding layer 105 and a cover plate 106. The plates 102, 104 and 106 are similar to the corresponding plates 2, 4, 6, and as such only the different parts are described.

In this case, the cover plate 106 and the second bonding layer 105 have two cut-outs, specifically a first cut-out 130 that is similar to the cut-out 30 of the sensor 1, and a second cut-out 131 that is positioned diametrically opposite the first cut-out 130. The cut-outs 130, 131 thus reveal two areas 104A, 104B, in this case in the form of circular segments, of the membrane plate 102.

In this case, the membrane plate 104 also has a detection circuit 110 including; in addition to the 3D detection resistors 111-1, 111-2, the planar detection resistors 112-1, 112-2 and the reference resistors 113-1, 113-2, 113-3 and 113-4; offset calibration resistors 114-1, 114-2, 114-3 and 114-4 (hereinafter also referred to collectively as offset calibration resistors 114) and temperature calibration resistors 115-1, 115-2, 115-3 and 115-4 (hereinafter also referred to collectively as temperature calibration resistors 115). The resistors 111-115, which are connected to one another and to the pads 116, are piezoresistors. The detection circuit 110, with the exception of the pads 116 and the calibration resistors 114 and 115, is surrounded by the second bonding layer 105, which seals same and transfers stresses and forces exerted on the base and cover plates 102, 106 to the membrane plate 104.

Figure 11:
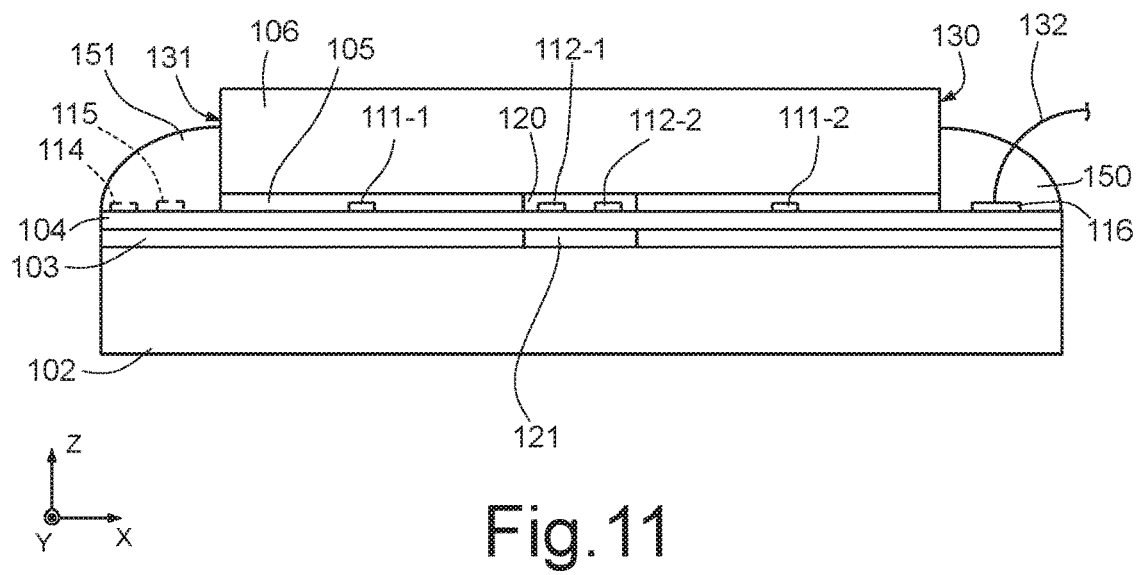
FIG. 11 is a cross section of the sensor in FIG. 10, taken along cross-section line XI-XI.

More specifically, the 3D detection resistors 111-1, 111-2 are in this case turned through 90° compared to FIG. 1, but in all other regards are the same as the detection resistors 11-1. In particular, said resistors are arranged in intermediate positions between the center and the circumference of the membrane plate 104 and are completely embedded in the second bonding layer 105 (FIG. 11).

Figure 10:
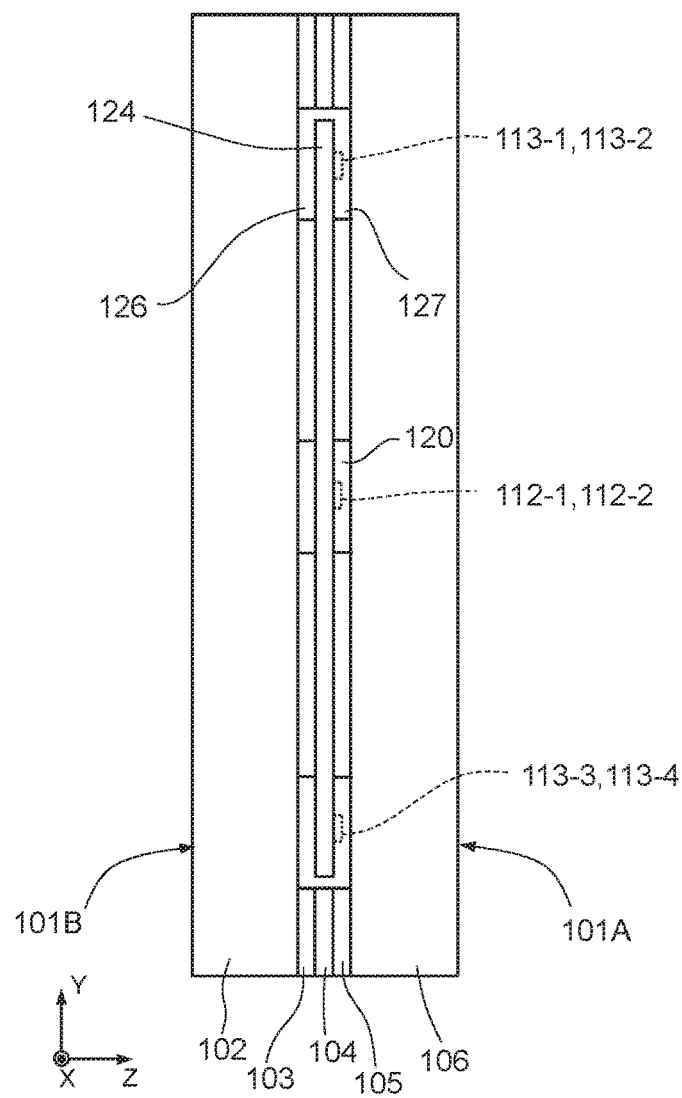
FIG. 10 is a cross section of the sensor in FIG. 9, taken along cross-section line X-X.

In this case, the planar detection resistors 112 are also arranged in a central zone of the membrane plate 104, which are in this case aligned with one another, along the second diametral line D'. Again in this case and as shown in FIGS. 10 and 11, a central aperture 120 of the second bonding layer 105 surrounds and is separated from the planar detection resistors 112. A central aperture 121 of the first bonding layer 103 is vertically aligned (parallel to the axis Z) with the central aperture 120 of the second bonding layer 105.

The reference resistors 13 are in this case arranged in pairs on the two brackets 124 turned through 90° compared to the brackets 24 in FIG. 1, and specifically extend in a radial direction towards the periphery of the membrane plate 104. The sides 124' are in this case parallel to the second diametral line D'. In this case, the brackets 124 are therefore also delimited by two C-shaped through-trenches 123 in the membrane plate 104 and surrounded by respective cavities 126 in the first bonding layer 103 and respective cavities 127 in the second bonding layer 105.

The offset calibration resistors 114 are arranged on the second area 104B of the membrane plate 102, symmetrically about the second diametral line D'. The offset calibration resistors 114 are not covered by the second bonding layer 105, and as a result are accessible for calibration after assembly of the sensor 100, and may be covered by a passivization layer 151, for example epoxy resin (FIG. 11) after calibration of the sensor 100.

The temperature calibration resistors 115 are also arranged on the second area 104B of the membrane plate 102, symmetrically about the second diametral line D'. As a result, the temperature calibration resistors 115 are disconnected from the cover plate 106.

Figure 9:
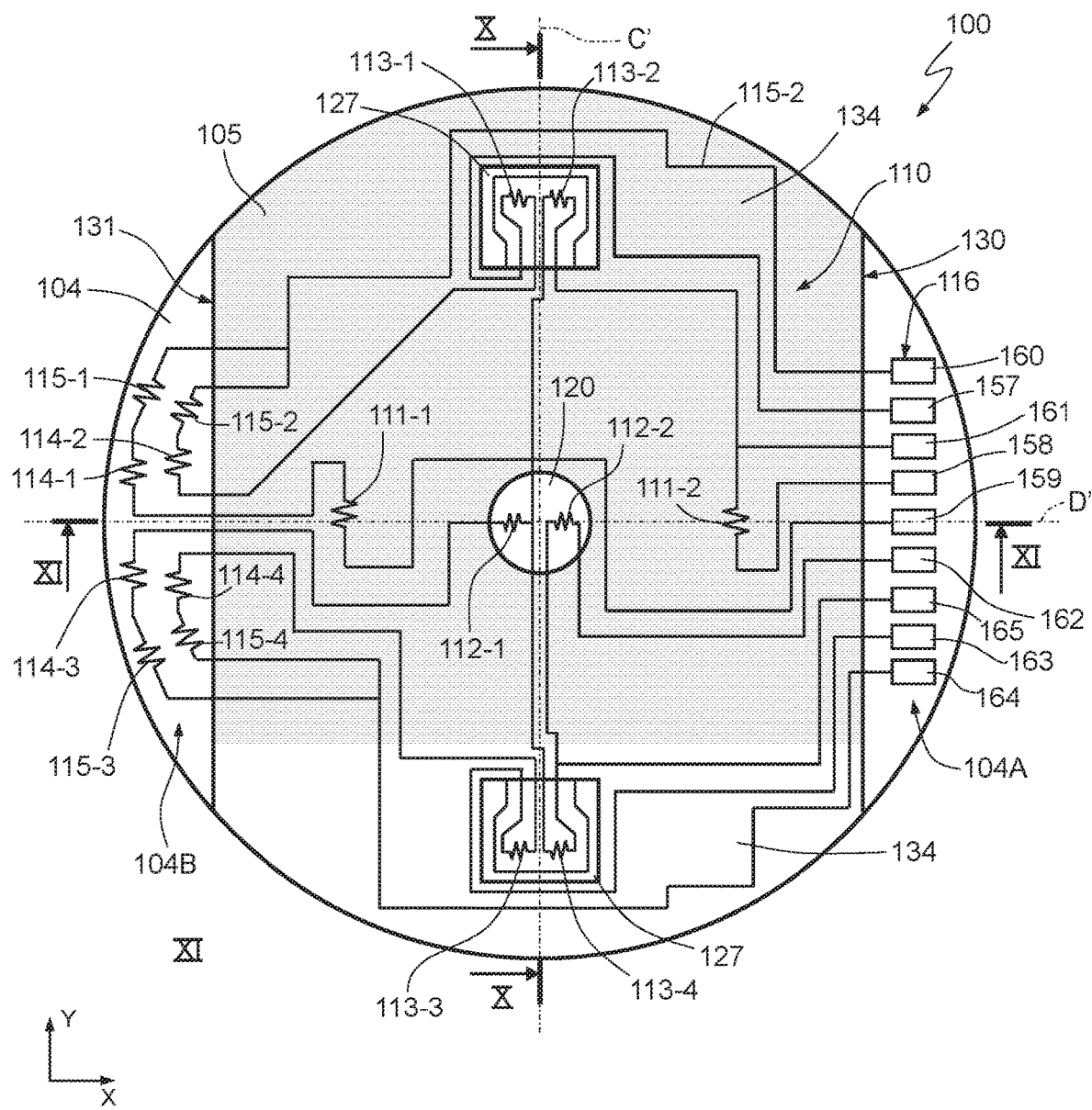
FIG. 9 is a top view of another embodiment of the present sensor with some portions removed and some transparent portions.

In the sensor 100 in FIGS. 9-11, each 3D detection resistor 111-1 and 111-2 and each planar detection resistor 112-1, 112-2 is connected in series to a respective offset calibration resistor 114-1, 114-2, 114-3 and 114-4 and to a respective temperature calibration resistor 115-1, 115-2, 115-3 and 115-4, such as to compensate for changes in the nominal value and variations in temperature, in a known manner.

Figure 12:
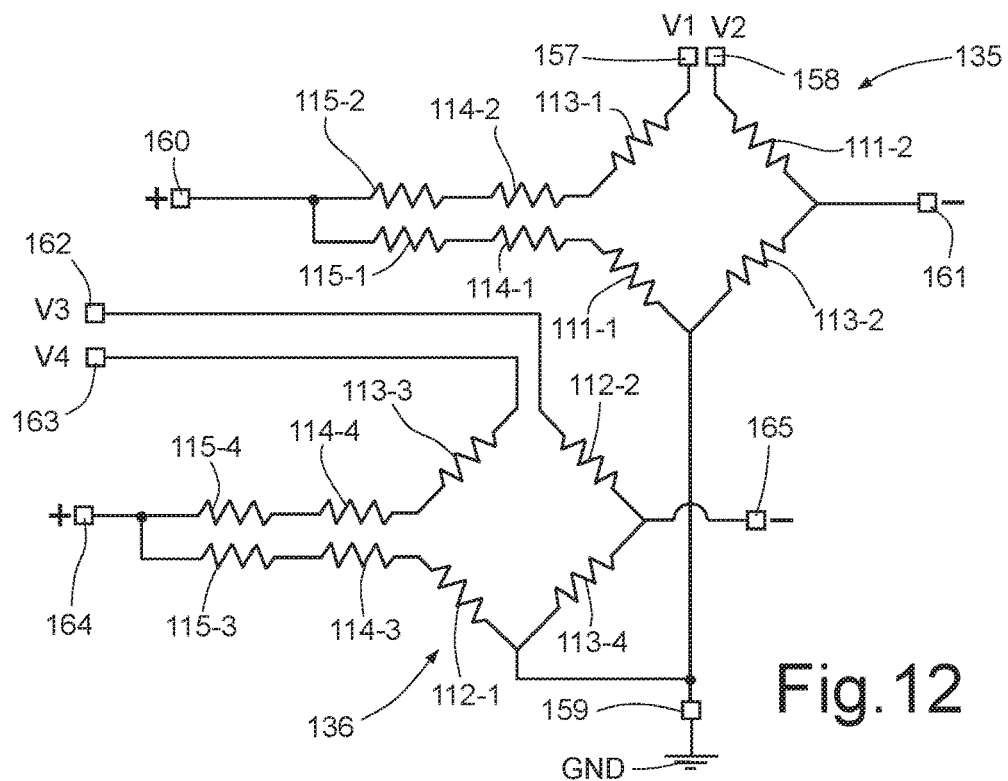
FIG. 12 shows the electrical equivalent of the sensor in FIGS. 8-11.

The resistors 111-115 are connected to one another as shown in FIG. 9 and form first and second Wheatstone bridges 135, 136, as shown in FIG. 12.

Figure 7:
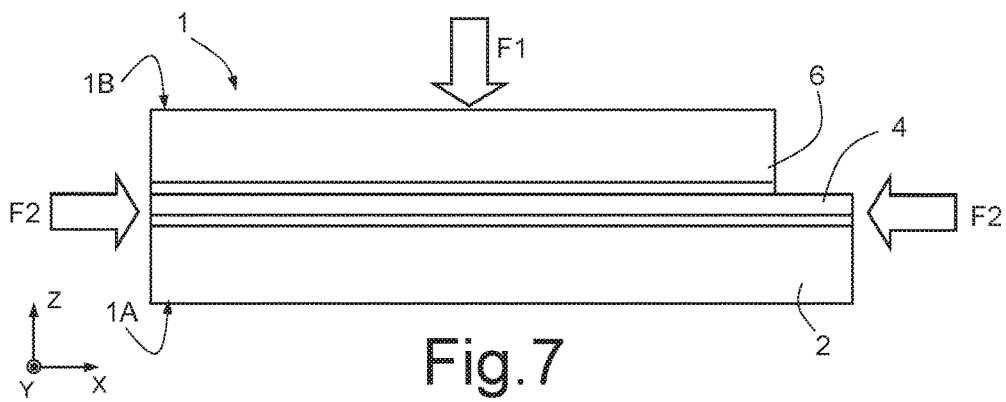
FIG. 7 is a schematic side view of the present sensor showing the acting forces under usage conditions.

More specifically, the Wheatstone bridges 135, 136, as shown in FIG. 12, are similar to the Wheatstone bridges 35, 36 in FIG. 7, with the following specific features:

the first Wheatstone bridge 135 has a pair of polarization terminals 157, 158 connected to respective pads 116, instead of a single polarization terminal connected to the pad 16-2, as in FIG. 7. The first polarization terminals 157, 158 can therefore receive different first polarization potentials V1, V2. This can be used to independently monitor the characteristics of the resistors of the first Wheatstone bridge 135, for example during the calibration phase, the first Wheatstone bridge 135 shares a reference terminal 159 with the second Wheatstone bridge 136 and is connected to a ground voltage GND, the 3D resistor 111-1 of the first Wheatstone bridge 135 is connected to an output terminal 160 via the calibration resistors 114-1 and 115-1, the reference resistor 113-1 of the first Wheatstone bridge 135 is connected to the output terminal 161 via the calibration resistors 114-2 and 115-2, the second Wheatstone bridge 136 has a pair of polarization terminals 162, 163 connected to respective pads 116, instead of a single polarization terminal. The first polarization terminals 161, 162 can therefore receive different first polarization potentials V3, V4 for monitoring the second Wheatstone bridge 136, and the planar resistor 112-1 of the second Wheatstone bridge 136 is connected to an output terminal 164 via the calibration resistors 114-3 and 115-3, the reference resistor 113-3 of the second Wheatstone bridge 136 is connected to the output terminal 164 via the calibration resistors 114-4, 115-4.

The sensor 100 in FIGS. 9-12 works in the same way as the sensor 1 in FIGS. 1-8. Furthermore, said sensor is more precise and reliable due to the option of calibrating the value of the resistors 11-13 and eliminating offset effects and thermal effects using the calibration resistors 14, 15.

Figure 13:
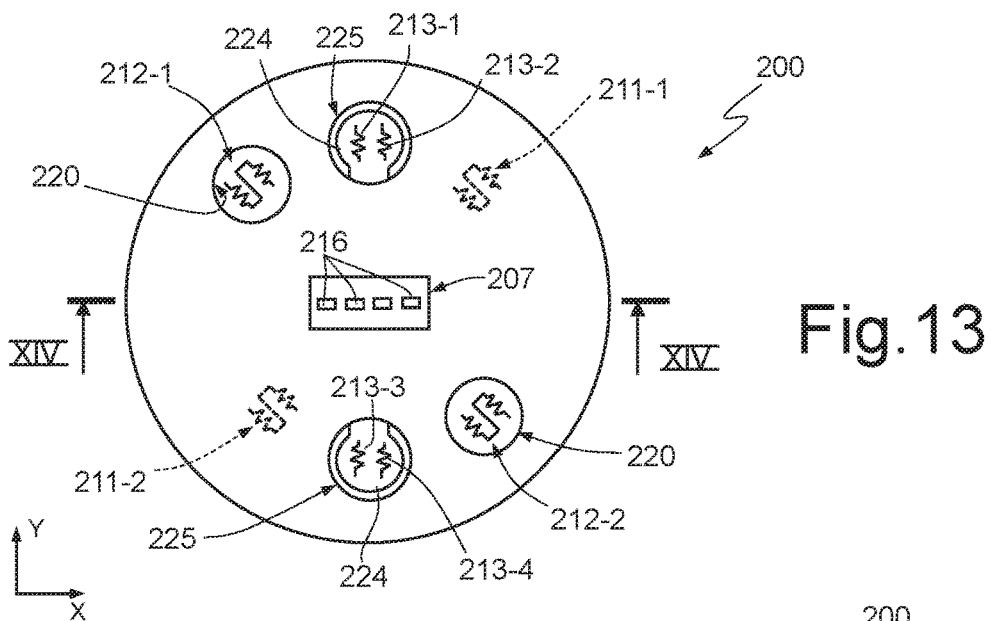
FIG. 13 is a simplified view similar to the view in FIG. 1 of a different embodiment of the present sensor.
Figure 14:
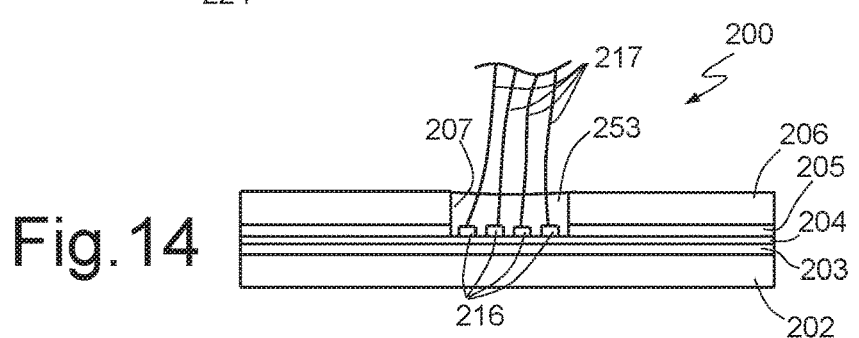
FIG. 14 is a cross section of the sensor in FIG. 13, taken along cross-section line XIV-XIV.

FIGS. 13 and 14 are schematic views of an embodiment of a sensor 200 in which the pads (indicated here using reference sign 216) are arranged centrally. More specifically, in the sensor 200, the 3D detection resistors 211-1 and 211-2, the planar detection resistors 212-1, 212-2 and the reference resistors 213-1, 213-2, 213-3 and 213-4 are all arranged in a ring zone at approximately the same distance from the center of the sensor 200, distributed angularly.

Furthermore, in this case the 3D detection resistors 211-1, 211-2 and the planar detection resistors 212-1, 212-2 are formed by connecting two resistors in series. As a result, each detection resistor 211, 212 is distributed over a larger area compared to the sensors 1, 100 and is therefore able to detect average deformations and average stresses that are less sensitive to isolated stresses.

Furthermore, each of the planar detection resistors 512-1, 512-2 is in this case arranged in its own aperture 520-1, 520-2.

Similarly to the sensors 1, 100, the sensor 200 is formed by a base plate and a cover plate, in this case indicated using reference signs 202 and 206 (the cover plate 206 is not shown in FIG. 13, for the sake of clarity) and a membrane plate, in this case indicated using reference sign 204, which are bonded between the bonding layers 203, 205. A through-aperture 207 passes through the cover plate 206 and the second bonding layer 205 (FIG. 14) in a central position in relation to the sensor 200, to enable access to the pads 216 after the plates 202, 204, 206 have been bonded. Wires 217 are welded to the pads 216. The aperture 207 may be filled with a mass 253 of insulating and sealing material, such as resin, after the wires 217 have been welded.

As for the rest, the sensor 200 is similar to the sensor 100, and as such the 3D detection sensors 211, the planar detection sensors 212 and the reference sensors 213 are carried on the membrane plate 204 and surrounded (in contact or otherwise) by the second bonding layer 205 in the same way as described above for the similar resistors 111-113. FIG. 13 in particular shows trenches 225 and brackets 224 formed by the membrane plate 204 and corresponding to the trenches 125 and the brackets 124 in FIG. 9, as well as apertures 220 in the second bonding layer 205.

The sensor 200 may also include calibration resistors (not shown) that are similar to the calibration resistors 114, 115 in FIGS. 9-10.

Figure 15:
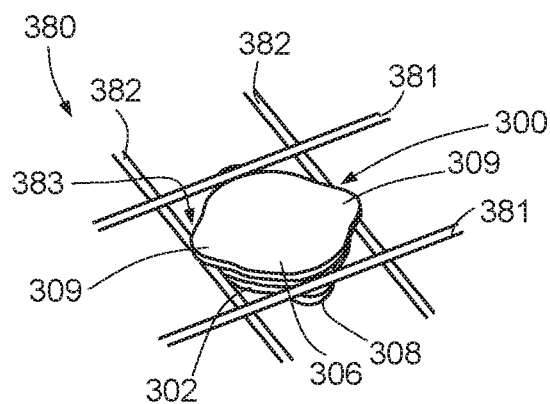
FIG. 15 is a perspective view of a variant of the present sensor, provided with supporting and coupling structures for embedding in a structured to be fabricated.

FIG. 15 shows a sensor 300 in which the base and cover plates, indicated here using reference signs 302, 306, each have two tabs or projections 308, 309 respectively. The projections 309 of the cover plate 306 extend in different directions, for example in diametrically opposing directions, as do the projections 308 from the base plate 302 (only one shown). Furthermore, the projections 308 of the base plate 302 are staggered, for example by 90°, compared to the projections 309 from the cover plate 306.

This arrangement facilitates coupling to a support structure, such as a frame 380 formed by two pairs of intersecting bars 381, 382 arranged in pairs such as to delimit a substantially square intersection zone 383. Arranging the bars of each pair of bars 381, 382 at a distance from one another slightly greater than the diameter of the sensor 300 (without taking into account the projections 308, 309) and less than the maximum size of the sensor 300 (taking into account the projections 308 or 309), the sensor 300 may be coupled easily by inserting same into the intersection zone 383 and twisting same such that the projections 308, 309 are substantially aligned with the edges of the intersection zone 383. Turning the sensor 300 through 45° in this manner positions the projections 308 from the base plate 302 beneath the bars of a first pair (in this case the bars 381) and the projections 309 of the second plate 306 above the bars of the other pair (in this case the bars 382), coupling the sensor 300 stably to the bars 381, 382 and holding same in position while the construction material, such as concrete, is being poured.

Figure 16:
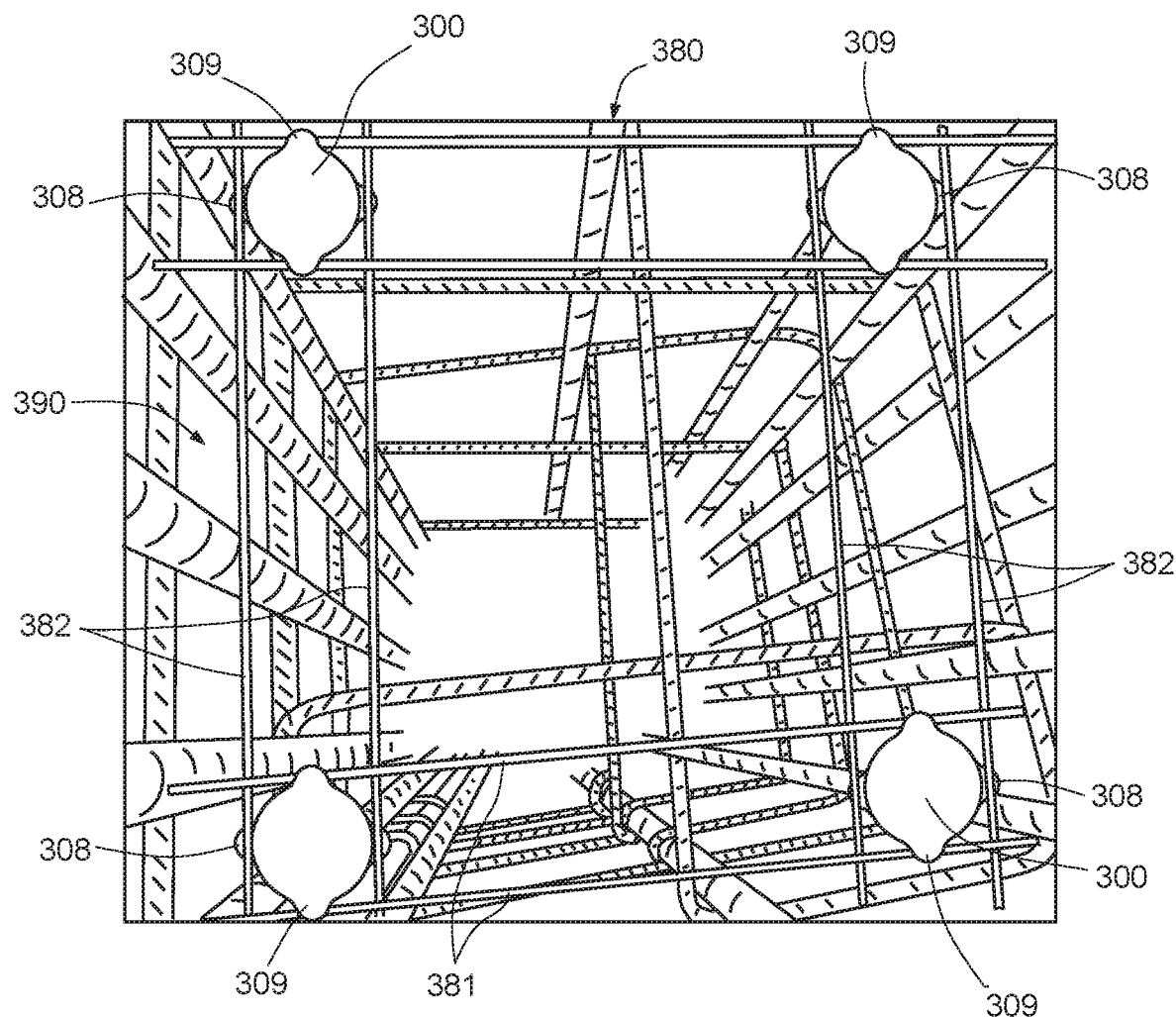
FIG. 16 is a perspective view of the sensor in FIG. 15 during construction of a building structure.

As shown in FIG. 16, the frame 380 may be attached to a formwork 390 of a construction to be built. FIG. 16 shows several frames 380 at different heights of the formwork 390. Each of the frames 380 includes a plurality of bars 381, 382 arranged such as to form a plurality of intersection zones 383 to which the same number of sensors 300 may be coupled.

Figure 17:
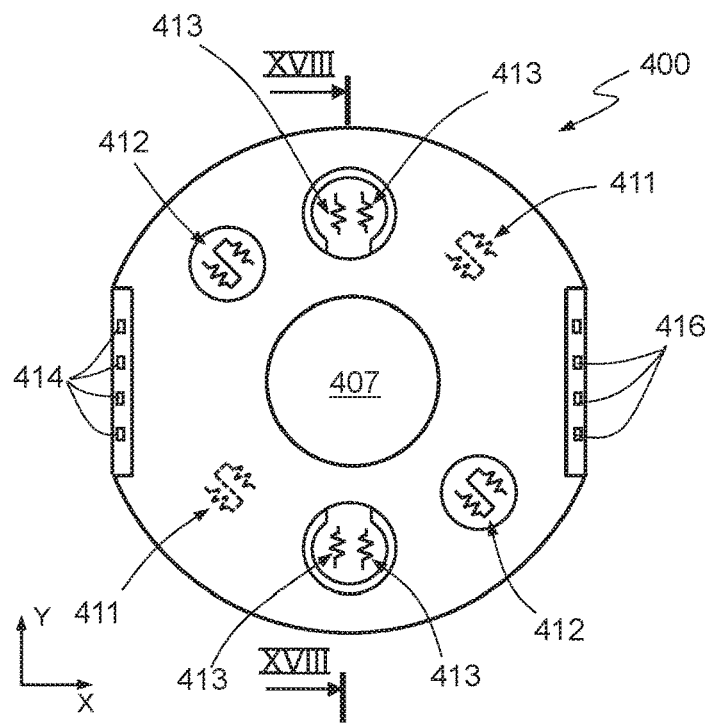
FIG. 17 is a simplified view similar to the view in FIG. 1 of another embodiment of the present sensor.
Figure 18:
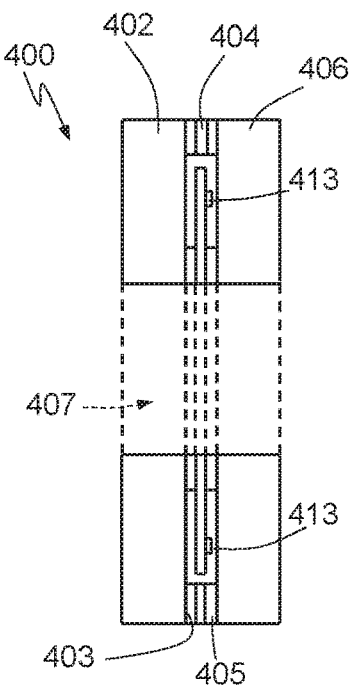
FIG. 18 is a cross section of the sensor in FIG. 17, taken along cross-section line XVIII-XVIII.

FIGS. 17 and 18 show a sensor 400 in the shape of a circular washer. Again in this case and similarly to FIGS. 13, 14, all of the resistors, including the 3D detection resistors 411, the planar detection resistors 412 and the reference resistors 413, are arranged inside a ring at substantially the same distance from the center of the sensor 400, distributed angularly. In this case, a through hole 407 passes through the plates and the bonding layers 402-406, and the pads 416 are arranged peripherally, similarly to FIGS. 1 and 9. The sensor 400 also includes offset calibration sensors 414 arranged peripherally as in FIG. 9. The 3D detection resistors 411 and the planar detection resistors 412 are divided up, as in FIG. 13.

Figure 19:
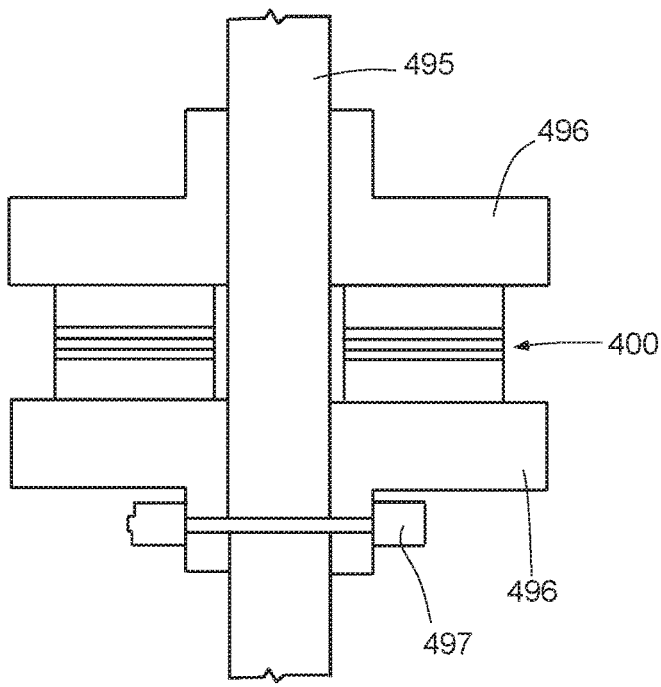
FIG. 19 shows a possible support and coupling method for the sensors in FIGS. 17 and 18.

The sensor 400 may be easily attached to a framework of a reinforced concrete structure, as shown for example in FIG. 19. In this case, the sensor 400 is slid onto a bar 495, for example a pillar bar, a beam bar or a segment bar. A pair of flanges 496, for example made of metal and also washer-shaped, are slid onto the bar 495 on both sides of the sensor 400, sandwiching same. The lower flange or both of the flanges 496 may be locked on the bar 495 by means of a pin or elastic ring 497, thereby fixing the height of the sensor 400 on the bar 495.

Figure 20:
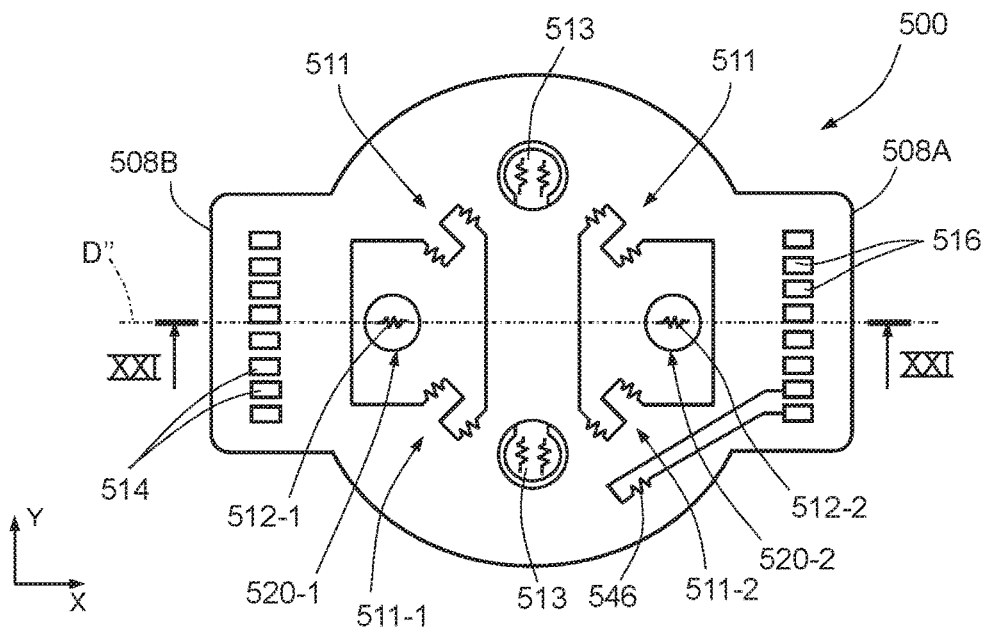
FIG. 20 is a simplified view similar to the view in FIG. 1 of another embodiment of the present sensor.
Figure 21:
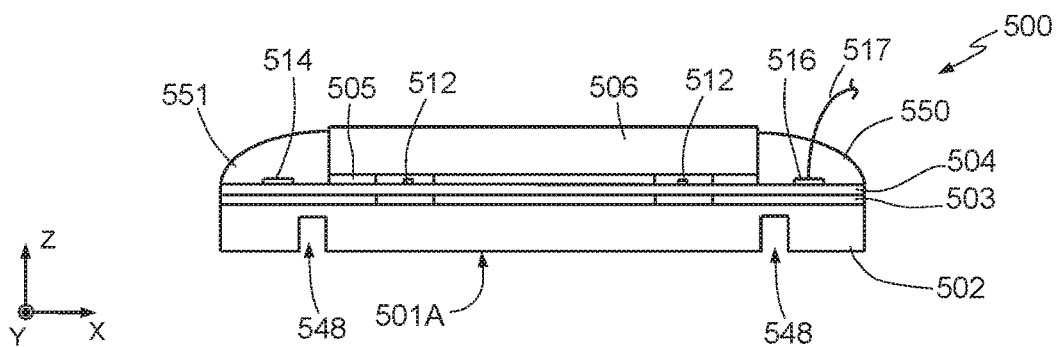
FIG. 21 is a cross section of the sensor in FIG. 20, taken along cross-section line XX-XX.

FIGS. 20 and 21 shows simplified views of a sensor 500 with an overall cylindrical shape and the circular base, provided with first and second diametrically opposed tabs 508A, 508B. The two tabs 508A, 508B are formed from the base plate 502, from the first bonding layer 503 and from the membrane plate 504. Conversely, the cover plate 506 and the second bonding layer 505 are blunted or in any case do not have the tabs 508. The pads 516 are arranged on the first tab 508A and the calibration resistors 514 are arranged on the second tab 508B. This enables the contact area to be enlarged and improves the quality of the seal provided by the passivation masses, indicated here using reference signs 550 and 551 (FIG. 21).

A pair of hollows 548 are formed in the first plate 502 from the first face 501A of the sensor 500, along the border between the tabs 508A, 508B and the cylindrical portion of the sensor 500 (FIG. 21). The hollows 548 may be linear (parallel to the axis Y) or curved around the circumference of the cylindrical portion, and are intended to disconnect the tabs 508A, 508B from the rest of the sensor 500 such as to prevent tensile stresses from being transmitted to the detection resistors 511, 512.

In FIGS. 20 and 21, the 3D detection resistors 511, the planar detection resistors 512 and the reference resistors 513, are all arranged inside a ring zone, similarly to the resistors 411-413 of the sensor 400. In this case, the 3D detection resistors 511 are distributed and specifically each 3D detection resistor 511 is made up of four resistive sections that are connected in pairs in series on two branches connected in parallel to one another, such as to be distributed over a significant area of the membrane plate 504.

As in FIG. 13, the planar detection resistors 512-1, 512-2 in FIG. 15 are each arranged in their own aperture 520-1, 512-2, and are diametrically opposed along the second diametral line D".

In this case, the membrane plate 504 also has a heat resistor 546 that is connected directly to the pad 516 connected to ground and to a suitable pad in order to provide a temperature signal, in a manner not shown in detail. For example, the heat resistor 546 may be made using an ink with a positive (or negative) thermal coefficient, for example using the same material and process as the heat calibration resistors 515, having known temperature behavior. This enables the sensor 500 to provide temperature information that can be used by the external unit 72 in FIG. 8 to calculate the values of the temperature-compensated signals s1, s2 according to (1) and/or to monitor the health state of the structure containing the sensor 500, when in use.

FIGS. 22-25 show a sensor 600 having a generally parallelepiped shape with a generally rectangular base and a simplified physical structure.

More specifically, the sensor 600 has just two plates, referred to as the membrane plate 604 and the cover plate 606, which are bonded together by a single bonding layer 605. The plates 604, 606 are rectangular when viewed from above (in the plane XY) and are made of ceramic. The bonding layer 605 may be made of glass.

Inside the sensor 600, the membrane plate 604 is wider (in the direction X) than the bonding layer 605 and the cover plate 606, but is of equal length, and same are arranged such that the cover plate 606 is arranged concentrically in relation to the membrane plate 604.

Figure 22:
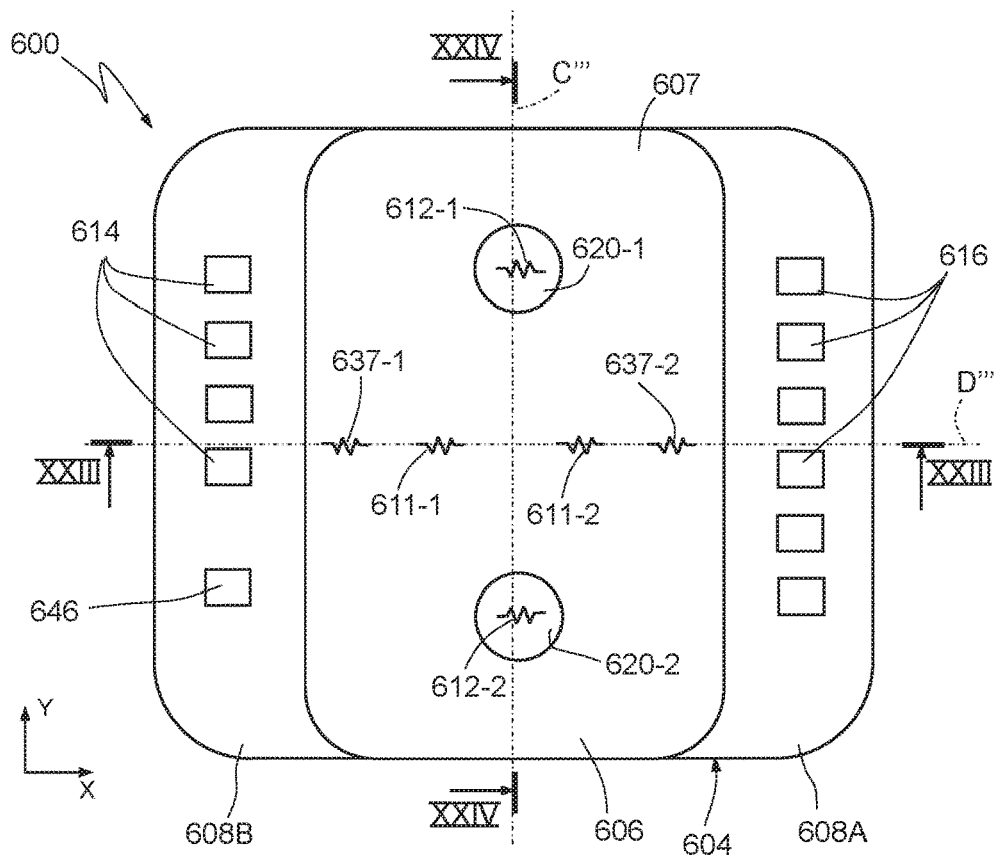
FIG. 22 is a simplified view similar to the view in FIG. 1 of another embodiment of the present sensor.
Figure 23:
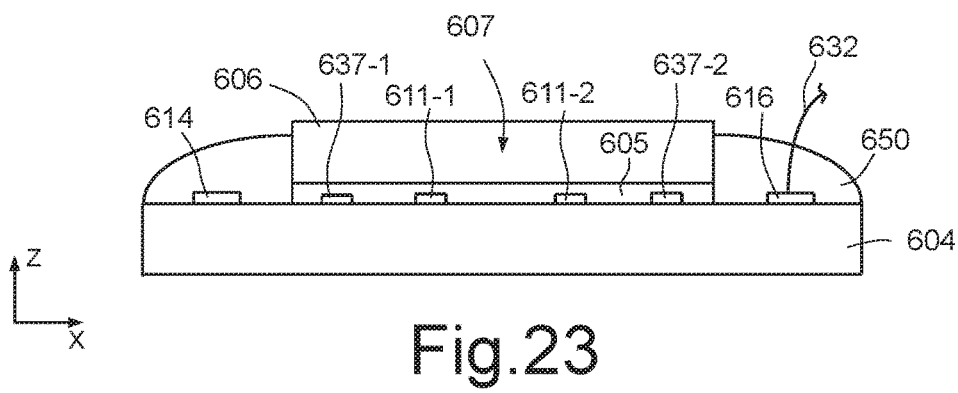
FIG. 23 is a cross section of the sensor in FIG. 22, taken along cross-section line XXIII-XXIII.

As a result, the sensor 600 has a parallelepipedic central zone 607 formed by stacking the plates 604, 606 and the bonding layer 605, and two tabs 608A, 608B arranged on two opposing sides of the central zone 607 and formed from the single membrane plate 604 (FIG. 23). A first tab 608A carries the pads 616 and a second tab 608B carries the calibration resistors 614 (also indicated in the drawing as a pair, 614-1 and 614-2, for the reasons set out below) as well as a heat resistor 646.

in the embodiment shown in FIG. 22, the detection circuit 610 includes two adaptation resistors 637-1 and 637-2. More specifically, the 3D detection resistors, indicated here using reference sign 611, are arranged along a first midline D'" parallel to the axis X, while the planar detection resistors, indicated here using reference signed 612, are arranged along a second midline C'" parallel to the axis Y. A first adaptation resistor 637-1 is connected in series to the first 3D detection resistor 611-1 and a second adaptation resistor 637-2 is connected in series to the second 3D detection resistor 611-2.

Although not shown, the 3D detection resistors 611 may be distributed, as in FIG. 20, and are completely embedded in the bonding layer 605. The planar detection resistors 612 are each made in a dedicated aperture 620-1, 620-2, passing completely through the bonding layer 605 (see FIG. 24). Alternatively, said resistors may be made close to the center of the sensor 600, similarly to FIG. 1, and/or split, as shown in FIG. 17. The adaptation resistors 637 are not piezoresistors, but are for example made of (thin-film) resistive ink completely embedded in the bonding layer 605 or in the second tab 608B or in appropriate apertures in the bonding layer 605. As an alternative to the foregoing, the adaptation resistors 637 may coincide with the two calibration resistors 614-1. In this case, the resistance (at rest) of the calibration resistors 614-1 differs from the calibration resistors 614-2, and is specifically the resistance of these latter plus the resistance of the adaptation resistors 637. In this case, the detection circuit has two compensation branches, each one connected in series to the respective one of the two 3D detection resistors 611.

Figure 24:
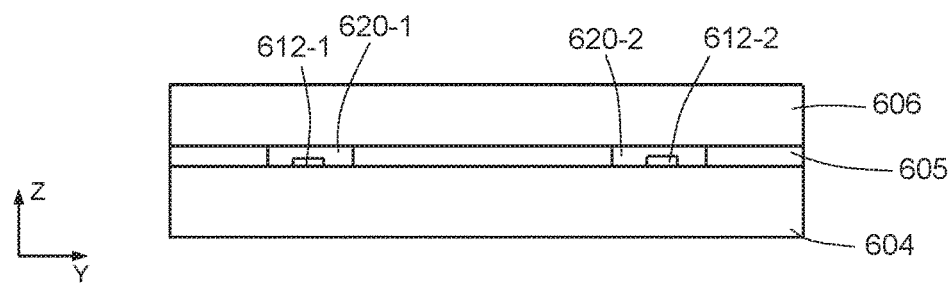
FIG. 24 is a cross section of the sensor in FIG. 22, taken along cross-section line XXIV-XXIV.

The sensor 600 in FIGS. 22-24 takes advantage of the fact that the reference component introduced by the reference resistors 13 (and the similar reference resistors 113, 213, 413, 513) is equal both in the output voltage $V_{O1}$ of the first Wheatstone bridge 35 and in the output voltage $V_{O2}$ of the second Wheatstone bridge 36, and is therefore canceled out in the processing carried out by the external unit 72, as discussed above. Consequently, under ideal conditions, the output voltages $V_{O1}$, $V_{O2}$ need not be referred to a zero value and such reference can therefore be eliminated, with the subsequent inability to calculate the planar force F2 and to flexibly adapt the relative sensitivity between the 3D resistors and planar resistors, depending on the application.

Figure 25:
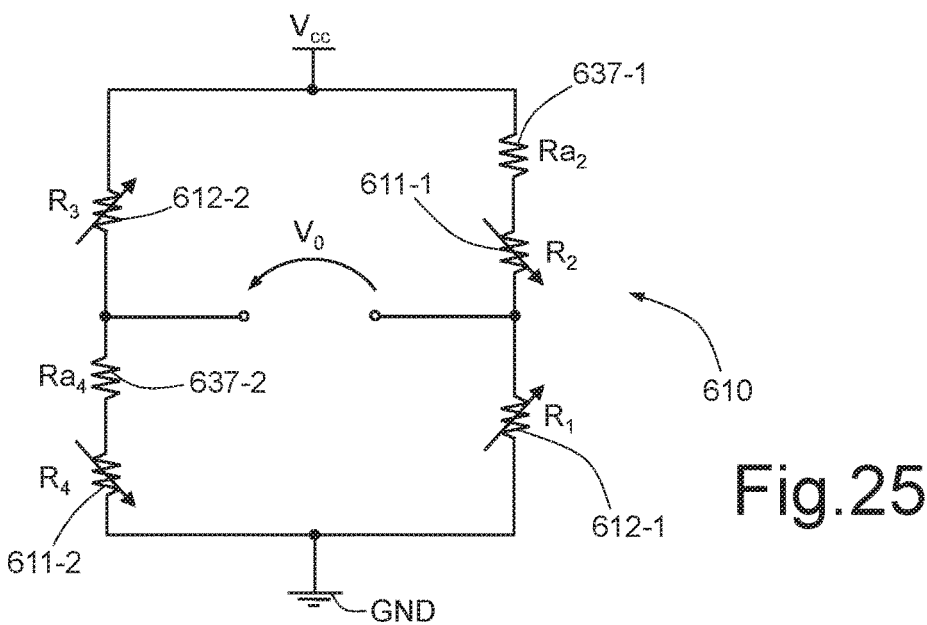
FIG. 25 shows the electrical equivalent of the sensor in FIGS. 22-24.

In the sensor 600, the sensitivity between the 3D detection resistors 611 and the planar detection sensors 612 is adapted using the adaptation resistors 637 of appropriate value (as discussed below) connected as a Wheatstone bridge circuit 610, as shown in FIG. 25.

In this embodiment, the values of the piezoresistors 611, 612 are selected such that the output of the circuit 610 nonetheless supplies the load value (force) acting vertically on the sensor 600. Particular reference is made to FIG. 25, which shows an equivalent wiring diagram of the sensor 600, in which the calibration resistors are not shown. Said sensors may nonetheless be included as shown in FIG. 12 for the first and second Wheatstone bridges 35, 36 of the sensor 100.

Specifically, for the circuit 610, the output $V_o$ is preferably linked to the variation in the resistance of the piezoresistors 611, 612 using a rule such as the following:

$$V_o = k(B^* \Delta R_{3D} - \Delta R_{PL}) \quad (2)$$

in which $\Delta R_{3D}$ and $\Delta R_{PL}$ are the variations in resistance of the 3D detection resistors 611 and the planar detection resistors 612.

Specifically:

$R_1$ is the resistance of the first planar detection resistor 612-1, $R_2$ is the resistance of the first 3D detection resistor 611-1, $R_3$ is the resistance of the second planar detection resistor 612-2, $R_4$ is the resistance of the second 3D detection resistor 611-2, $Ra_2$ is the resistance of the first adaptation resistor 637-1, and $Ra_4$ is the resistance of the second adaptation resistor 637-2, in which:

$$R1 = R_{10} + \Delta R_1, R_2 = R_{20} + \Delta R_2, R_3 = R_{30} + \Delta R_3, R_4 = R_{40} + \Delta R_4 \quad (3)$$

where $R_{i0}$ are the values of the i-th at-rest resistance (no stress) and $\Delta R_i$ is the variation of the i-th resistance caused by the stress, and the at-rest resistance values are chosen such that:

$$R_{10} = R_{20} + Ra_2 = R_{30} = R_{40} + Ra_4 \quad (4)$$

The output voltage $V_O$ of the bridge 610 is:

$$V_o = \frac{V_{CC}(R_4 + Ra_4)}{R_3 + R_4 + Ra_4} - \frac{V_{CC} R_1}{R_1 + R_2 + Ra_2} \quad (5)$$

Taking (3) and (4) into consideration, (5) becomes:

$$V_o = V_{CC} \left[ \frac{(R_{10} + \Delta R_4)}{2R_{10} + \Delta R_3 + \Delta R_4} - \frac{\Delta R_1 + R_{10}}{2R_{10} + \Delta R_1 + \Delta R_2} \right] \quad (6)$$

In the presence of an external force acting on the sensor 600, the resistance of the 3D detection resistors 611, which are being crushed, tends to fall and the resistance of the planar resistors 612 arranged in the aperture 620 tends to increase. Therefore, to a first approximation, $\Delta R_1 \approx -\Delta R_2$ and $\Delta R_3 \approx -\Delta R_4$. Furthermore, the resistance variation values $R_i$ are much smaller than $R_{10}$ and can be disregarded.

(6) therefore becomes:

$$V_o \approx \frac{V_{CC}}{2R_{10}} (\Delta R_4 - \Delta R_1) \quad (7)$$

To determine the values of the adaptation resistors (or to calculate the value of the desired adaptation, factor B<1 in (2)), (7) is rewritten as follows, bearing in mind that, by definition, each resistance variation $\Delta R_i = \Delta \rho_i R_{i0}$, with variation in the resistivity caused by the piezoresistive effect:

$$V_o \approx k(\Delta \rho_4 R_{40} - \Delta \rho_1 R_{10}) \quad (7')$$

where $$k = \frac{V_{CC}}{2R_{10}}.$$

Making (8') equal to (3), gives:

$$\Delta R_4 = \Delta \rho_4 R_{40} = B \Delta R_{3D}$$

Bearing in mind that:

$$\Delta R_{3D} = \Delta \rho_{3D} R_{3D0}$$

$$\Delta \rho_{3D} = \Delta \rho_4$$

and (to build the hypothetical bridge giving rise to (3))

$$R_{3D0} = R_{PL0} = R_{10},$$

gives:

$$\Delta \rho_4 R_{40} = B \Delta \rho_4 R_{10}$$

and therefore:

$$R_{40} = BR_{10} e R_{\alpha 4} = R_{10} - R_{40}$$

The sensor described herein provides numerous advantages.

It has reduced manufacturing costs due to the fact that it can be made of inexpensive materials, such as ceramic, glass and thick-film components, using known manufacturing techniques that are simple and applied on a large scale in the semiconductor industry. Furthermore, the sensor has a limited number of components that are simple to configure and easy to bond.

The sensitive parts of the sensor described are protected against external agents, in particular water and humidity. In particular, the fact that the bonding layer or layers are the layers that guaranteed the seal is advantageous. Indeed, the sensor is intrinsically sealed and guarantees protection of the sensitive elements (piezoresistors) from the external environment. The pads and cables can also be protected from water and humidity, and as a result the sensor is able to work reliably in difficult environments, such as concrete building structures, and for long periods of time.

The response of the sensor is very linear in relation to the load applied, over a wide range of forces/pressures.

The sensor can be scaled to increase or reduce the overall dimensions, in order to optimize same to the specific application and/or the forces/pressures to be measured.

Due to the somewhat similar features of the different materials (ceramic, glass), the sensor is also suitable for applications with wide variations in temperature, both in terms of mechanical integrity and the temperature sensitivity of same, which is somewhat stable.

In the complete two-bridge configuration, the sensor is able to provide information on the stresses acting in all three Cartesian directions. In particular, the sensor described is able to disconnect the planar stress (represented by the planar force F2 in FIG. 7) from the vertical stress (represented by the transverse force F2) and therefore to acquire the information used to determine the health state of the structure being monitored.

The sensor provides good sensitivity and can be calibrated and temperature-compensated, and is therefore precise.

It is evident that modifications and variations may be made to the sensor described and illustrated without thereby moving outside the scope of protection of the present disclosure. For example, the different embodiments described may be combined to provide further solutions. In particular, the number of plates, the shape of the plates and the position of the piezoresistors may be changed and combined in different ways, as may the shape and position of the apertures in the bonding layer surrounding the resistors.

The sensor may be of any shape.

The apertures used to seat the planar resistors need not be through holes, provided they prevent contact with the bonding layer.

The tabs of the sensor may be staggered as shown in FIG. 15, including in the embodiment with just two plates (membrane plate and cover plate).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stress sensor comprising:
a membrane plate;
a first bonding layer superposed on the membrane plate;
a cover plate superposed on the first bonding layer, the first bonding layer bonding the membrane plate to the cover plate;
three-dimensional piezoresistive elements extending across the membrane plate and embedded in the first bonding layer; and
planar piezoresistive elements extending across the membrane plate, the planar piezoresistive elements being laterally surrounded by and separated from the first bonding layer.

2. The sensor according to claim 1, wherein the first bonding layer includes at least one through aperture that laterally surrounds and is separated from the planar piezoresistive elements.

3. The sensor according to claim 1, wherein the three-dimensional piezoresistive elements include a first pair of piezoresistors and the planar piezoresistive elements include a second pair of piezoresistors, the piezoresistors of each pair of piezoresistors being arranged on opposite branches of a bridge circuit.

4. The sensor according to claim 1, further comprising:
a second bonding layer; and
a base plate bonded to the membrane plate via the second bonding layer.

5. The sensor according to claim 4, wherein the cover, membrane, and base plates include ceramic material, and the first and second bonding layers each include a glass layer.

6. The sensor according to claim 4, wherein the membrane plate has a face oriented towards the cover plate, the three-dimensional piezoresistive elements and the planar piezoresistive elements extending across the face of the membrane plate.

7. The sensor according to claim 6, also including reference piezoresistive elements extending across the face of the membrane plate.

8. The sensor according to claim 7, wherein:
the membrane plate includes brackets that are lateral surrounded by respective trenches extending through the membrane plate each having an open shape;
the first bonding layer has first apertures extending through the first bonding layer, the first apertures being aligned with the brackets, respectively;
the second bonding layer has second apertures extending through the second bonding layer, the second apertures being aligned with the brackets, respectively; and
the reference piezoresistive elements are arranged on the brackets, respectively.

9. The sensor according to claim 8, wherein the three-dimensional piezoresistive elements include a first pair of piezoresistors, the planar piezoresistive elements include a second pair of piezoresistors and the reference piezoresistive elements include third and fourth pairs of piezoresistors, the sensor further comprising:
a first bridge circuit having first opposite branches that include the piezoresistors of the first pair of piezoresistors and second opposite branches that include the piezoresistors of the third pair of piezoresistors; and
a second bridge circuit having third opposite branches that include the piezoresistors of the second pair of piezoresistors and fourth opposite branches that include the piezoresistors of the fourth pair of piezoresistors.

10. The sensor according to claim 9, wherein the membrane plate includes a peripheral area and the cover plate and first bonding layer have respective cut-out areas in which the peripheral area of the membrane plate is not covered by the cover plate and first bonding area, the sensor further comprising:
first external access terminals electrically coupled to the first bridge circuit and arranged on the peripheral area on the membrane plate; and
second external access terminals electrically coupled to the second bridge circuit and arranged on the peripheral area on the membrane plate.

11. The sensor according to claim 10, further comprising a sealing mass that covers the peripheral area of the membrane plate.

12. The sensor according to claim 9, wherein the membrane plate includes a central zone and the cover plate and first bonding layer have respective through apertures in which the central zone of the membrane plate is not covered by the cover plate and first bonding area, the sensor further comprising:
first external access terminals electrically coupled to the first bridge circuit and arranged in the central zone of the membrane plate; and
second external access terminals electrically coupled to the second bridge circuit and arranged in the central zone of the membrane plate.

13. The sensor according to claim 4, wherein the second bonding layer has a second through aperture around the planar piezoresistive elements.

14. The sensor according to claim 1, wherein the membrane plate includes a peripheral area and the cover plate and first bonding layer have respective cut-out areas in which the peripheral area of the membrane plate is not covered by the cover plate and first bonding area, the sensor further comprising
piezoresistive calibration elements connected in series to each three-dimensional piezoresistive element and each planar piezoresistive element, the piezoresistive calibration elements being arranged on the peripheral area of the membrane plate.

15. The sensor according to claim 14, further comprising a protective mass that covers the peripheral area of the membrane plate.

16. The sensor according to claim 14, further comprising temperature calibration resistors carried on the membrane plate, each temperature calibration resistor being connected in series to a respective one of the piezoresistive calibration elements.

17. The sensor according to claim 1, further comprising:
external terminals; and
a temperature measurement resistor carried on the membrane plate and connected to the external terminals of the sensor, the temperature measurement resistor being surrounded by and separated from the first bonding layer.

18. The sensor according to claim 1, having a central through hole that extends completely through the membrane plate, first bonding layer, and cover plate.

19. The sensor according to claim 1, further comprising:
a base plate coupled to the membrane plate;
a first pair of tabs extending outwardly from the base plate; and
a second pair of tabs extending outwardly from the cover plate, arranged at a different height than the tabs of the first pair, and angularly staggered in relation to the tabs of the first pair.

20. A load detection system, comprising:
a stress sensor that includes:
a membrane plate;
a first bonding layer superposed on the membrane plate;
a cover plate superposed on the first bonding layer, the first bonding layer bonding the membrane plate to the cover plate;
three-dimensional piezoresistive elements, extending across the membrane plate and embedded in the first bonding layer; and
planar piezoresistive elements extending across the membrane plate, the planar piezoresistive elements being laterally surrounded by and separated from the first bonding layer;
a signal handling unit;
wired connections electrically coupling the sensor to the signal handling unit;
a communication path; and
a processing unit coupled to the signal handling unit by a communication path.

21. The system according to claim 20, wherein the communication path includes wireless transmitter and receiver elements.

22. A stress sensor comprising:
a support structure;
a first interface layer positioned on the support structure;
a three-dimensional piezoresistive element positioned on the support structure and embedded in the first interface layer such that the first interface layer contact the three-dimensional piezoresistive element along three axes that are mutually perpendicular to each other; and
a planar piezoresistive element positioned on the support structure, the planar piezoresistive element being positioned within a cavity formed in the first interface layer and laterally spaced apart from a wall of the cavity.

23. The sensor according to claim 22, further comprising:
a cover plate positioned on the first interface layer, the first interface layer coupling the support structure to the cover plate;
a second interface layer; and
a base plate coupled to the support structure via the second interface layer.

24. The sensor according to claim 22, wherein:
the support structure includes a bracket that is lateral surrounded by a trenches extending through the support structure and having an open shape; and
the first interface layer has a first aperture extending through the first interface layer, the first aperture being aligned with the bracket, the sensor further comprising:
a reference piezoresistive element positioned on the bracket and spaced apart from the first interface layer.

* * * * *